United States Patent
Ishigooka et al.

(10) Patent No.: US 11,366,443 B2
(45) Date of Patent: Jun. 21, 2022

(54) CONTROLLER

(71) Applicant: Hitachi, Ltd., Tokyo (JP)

(72) Inventors: Tasuku Ishigooka, Tokyo (JP); Yuki Horita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 71 days.

(21) Appl. No.: 16/617,705

(22) PCT Filed: Jun. 15, 2017

(86) PCT No.: PCT/JP2017/022112
§ 371 (c)(1),
(2) Date: Nov. 27, 2019

(87) PCT Pub. No.: WO2018/229930
PCT Pub. Date: Dec. 20, 2018

(65) Prior Publication Data
US 2020/0159180 A1   May 21, 2020

(51) Int. Cl.
*G05B 19/048* (2006.01)
(52) U.S. Cl.
CPC .. *G05B 19/048* (2013.01); *G05B 2219/24007* (2013.01)
(58) Field of Classification Search
CPC ............. G05B 19/048; G05B 2219/24007
See application file for complete search history.

(56) References Cited

U.S. PATENT DOCUMENTS

| | | | | |
|---|---|---|---|---|
| 5,948,112 A | * | 9/1999 | Shimada | G06F 11/1407 714/16 |
| 6,356,821 B1 | * | 3/2002 | Yoshida | G05B 9/02 123/333 |
| 2003/0183194 A1 | * | 10/2003 | Noguchi | F02D 37/02 123/396 |
| 2007/0083304 A1 | * | 4/2007 | Yamada | H04L 43/0811 701/31.4 |
| 2008/0172573 A1 | * | 7/2008 | Jansson | G06F 11/2035 714/15 |
| 2011/0246819 A1 | * | 10/2011 | Callaway | G06F 11/2038 714/6.3 |

(Continued)

FOREIGN PATENT DOCUMENTS

JP   H05-012048 A   1/1993
JP   2017-092835 A   5/2017

(Continued)

OTHER PUBLICATIONS

Kitani, Automatic Driving System, Automatic Driving Control Method, Data ECU and Automatic Driving ECU, 2015, Espacenet, 1-12, (translation of JP6650242B2) (Year: 2015).*

(Continued)

*Primary Examiner* — Michelle T Bechtold
*Assistant Examiner* — Yvonne Trang Follansbee
(74) *Attorney, Agent, or Firm* — Foley & Lardner LLP

(57) ABSTRACT

Fail operational that can guarantee stability of control while suppressing cost increase is difficult. A control controller according to the present invention stores information necessary for recovery in a normal travel mode in time series in a backup, and thus control software can be recovered from the backup in real time if a failure occurs in the system.

7 Claims, 18 Drawing Sheets

(56) References Cited

U.S. PATENT DOCUMENTS

| | | | |
|---|---|---|---|
| 2012/0221884 A1* | 8/2012 | Carter | G06F 11/0793 |
| | | | 714/2 |
| 2013/0277969 A1 | 10/2013 | Nielsen | |
| 2016/0202146 A1* | 7/2016 | Enomoto | F02D 41/009 |
| | | | 73/114.26 |
| 2017/0220035 A1 | 8/2017 | Naoi | |
| 2017/0277607 A1 | 9/2017 | Samii et al. | |
| 2018/0281816 A1 | 10/2018 | Otsuka | |

FOREIGN PATENT DOCUMENTS

| | | | | |
|---|---|---|---|---|
| JP | 6650242 B2 * | 2/2020 | | B60W 50/0205 |
| WO | WO-2015/129311 A1 | 9/2015 | | |

OTHER PUBLICATIONS

International Search Report with English translation and Written Opinion issued in corresponding application No. PCT/JP2017/022112 dated Sep. 19, 2017.

Extended European Search Report issued in European Patent Application No. 17913626.2 dated Nov. 18, 2020, (9 pages).

* cited by examiner

⟶ CONTROL PLAN VALUE OF CONTROL PLAN VALUE BACKUP

----> CONTROL PLAN VALUE OF BACKUP CONTROL PROGRAM

CONTROLLER

TECHNICAL FIELD

The present invention relates to a technique for safely switching to a backup control program when a failure occurs in a control system.

BACKGROUND ART

Many control systems in recent years are constituted of a plurality of controllers, which operate in cooperation with a wired network or a wireless network. For example, a vehicle system includes an ECU that operates a computerized vehicle control device, that is, an electronic control unit, and an onboard network that enables communication among a plurality of ECUs. In the field of vehicle system, there is an increasing demand for an automatic driving system that automatically brings a vehicle to a destination without an accelerator operation, a brake operation, or a steering operation by a driver. In this system, fail operational is demanded that enables the automatic driving system service to continue so that the user can safely reach the desired destination or evacuate to a safe place when an automatic driving integrated ECU that takes over operations and judgments of the driver fails. As a specific method, a capability to continue an automatic traveling function can be mentioned.

One of methods for realizing fail operational is having redundancy of functions. For example, in a hot standby method, two or more ECUs having the same functions are prepared, and two or more are executed simultaneously before a failure occurs. In this method, when one fails, processing can be continued by switching to another instantaneously. In this case, if functions are made redundant with the same algorithm and design concept, a failure of the same factor may occur such that all redundant controllers fail at the same time due to the same failure factor, and thus it is demanded to achieve redundant systems with different algorithms and design concepts. The hot standby method is effective for a control system because it can be switched in real time, but there is a problem that the cost becomes high.

As another method, there is a cold standby method that activates a function when a failure occurs, but there is a problem that a real-time property requirement for the control system cannot be satisfied. In PTL 1 below, system data are saved in a back up before a failure, and even if a failure occurs, high-speed recovery is realized by copying the data stored in the backup to a newly activated system. Note that the recovery refers to a series of processes from starting up an alternative function, initializing the function to be capable of taking over, and allowing taking over to the previous function.

CITATION LIST

Patent Literature

PTL 1: JP 5-12048 A

SUMMARY OF INVENTION

Technical Problem

However, in above-mentioned PTL 1, since all data are not compatible among different control systems, recovery is not possible only by backup of data. Although deficient data is gradually initialized by applying calculation results of another control system, a time is needed and there is a problem that the real time property of the control system cannot be guaranteed.

The present invention has been made to solve the above-described problems, and it is an object thereof to provide a controller that enables control software of different functions prepared as a backup to be recovered in real time if a failure occurs in part of the control system.

Solution to Problem

In order to solve the above problems, a controller of the present invention includes a control backup data extraction unit that extracts a state value and a control plan value calculated by one control program, a control backup data storage unit that stores the state value, the control plan value, and an input value which another control program refers to in time series as a backup, and a control program fast start unit that inputs the state value and the input value to the other control program in an order of the time series after a failure of the one control program is detected, and maintains a control function in a state in which control output is possible.

Advantageous Effects of Invention

According to the controller of the present invention, even if a failure occurs in a system, the system can be switched in real time to a control software prepared as a backup, and thus availability and safety can be ensured.

DESCRIPTION OF EMBODIMENTS

A controller according to the present invention backs up a state value of control software before a system fails, and further backs up a necessary input value in time series until the control software after recovery performs normal output. Thus, when recovering the system after a failure is detected, backup control software can be quickly recovered to a state of being capable of performing normal output by using the backed-up state value and input value, thereby ensuring availability and safety of the system.

Hereinafter, embodiments of the present invention will be described using the drawings.

First Embodiment

Figure 1:
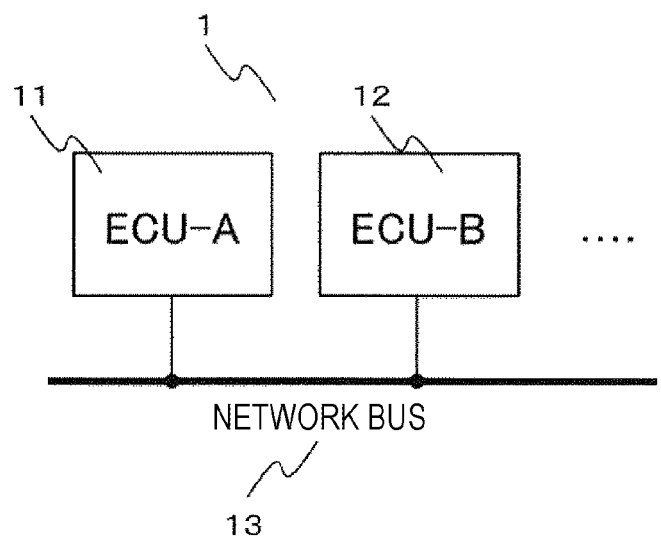
FIG. 1 is a configuration diagram of a vehicle system according to a first embodiment.

FIG. 1 is a configuration diagram of a vehicle system 1 according to a first embodiment of the present invention. This system includes an ECU-A (controller unit) 11, an ECU-B (controller unit) 12, and a network bus 13. Note that one including the ECU-A (control unit) 11, the ECU-B (control unit) 12, and the network bus 13 is referred to as a controller.

In this example, the ECU-A 11 assumes an automatic driving ECU that calculates a travel path of a vehicle according to surrounding conditions, and the ECU-B 12 assumes a vehicle motion ECU that calculates motion control of the vehicle according to the travel path, and sends control commands to an engine ECU, a brake ECU, and a steering ECU. However, it is not limited thereto. In this embodiment, the network bus 13 is assumed to be a bus type network bus such as controller area network (CAN), controller area network flexible data (CAN-FD), or FlexRay, but is not limited thereto. For example, a one-to-one network bus such as Ethernet may be used. The ECU-A 11 and the ECU-B 12 can communicate data via the network bus 13.

Figure 2:
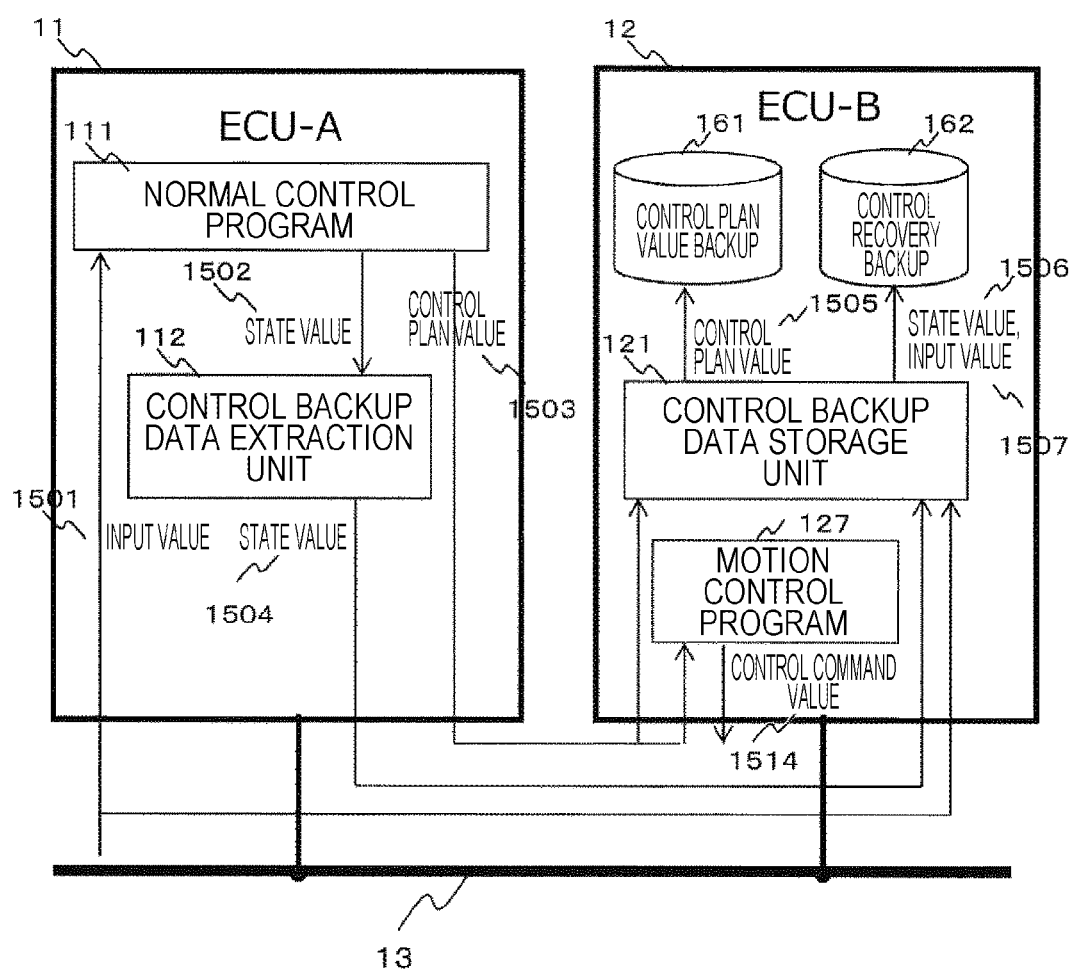
FIG. 2 illustrates an operation flow in a normal travel mode according to the first embodiment.

FIG. 2 is an operation flow in a normal travel mode 1021 according to the first embodiment.

The ECU-A 11 includes a normal control program 111 and a control backup data extraction unit 112, and the ECU-B 12 includes a control backup data storage unit 121 and a motion control program 127. The ECU-B 12 includes a control plan value backup 161 and a control recovery backup 162 as backup data.

The normal control program 111 updates a state value 1502 indicating an internal state of the program based on an input value 1501, and sends a control plan value 1503 to the ECU-B 12.

The input value 1501 is data which a program refers to for calculation, and is, for example, an input value of a sensor or a result of calculation by another ECU. The control plan value 1503 is information indicating a plan for operating a control target. For example, it is a travel path up to several seconds ahead of the vehicle.

The state value 1502 is an internal state of the program and is, for example, a state which the program internally manages such that the current vehicle is in the course of crossing a lane due to a lane change by the program.

The control backup data extraction unit 112 reads the state value 1502 of the normal control program 111 and sends the state value 1502 to the ECU-B 12.

The control backup data storage unit 121 of the ECU-B 12 receives the control plan value 1503 and stores a control plan value 1505 in the control plan value backup 161. The control plan value 1503 and the control plan value 1505 may be the same value, or may be converted based on specific rules. Further, the control backup data storage unit 121 receives the input value 1501 and a state value 1504, and stores a state value 1506 and an input value 1507 in the control recovery backup. The state value 1504 and the state value 1506 may be the same value, or may be converted based on specific rules. The input value 1501 and the input value 1507 may be the same value, or the input value 1507 may be a subset of the input direct value 1504 or vice versa. For example, when the input value 1504 is an external recognition result by a laser range sensor and an external recognition result by a camera, the input value 1507 may be only the external recognition result by the camera. The input value 1507 is determined based on an input of control software to be recovered.

The storage format of the control recovery backup 162 is assumed to store in a time series order so that state values and input values for a certain period are not lost. This time series is equal to or more than minimum data necessary until the control software executed as a backup becomes capable of generating a normal output. The control plan value backup 161 is a database that stores the control plan value 1503 of the normal control program 111. According to the present embodiment, only the control plan value 1503 of the normal control program 111 is stored, but the present invention is not limited thereto. For example, control plan values for a plurality of control programs may be stored. The control recovery backup 162 is a database that stores the state value 1502 and the input value 1501 of the normal control program 111.

According to the present embodiment, only the state value 1502 of the normal control program 111 is stored, but the present invention is not limited thereto. For example, state values of a plurality of control programs may be stored. The motion control program 127 receives the control plan value 1503 sent by the normal control program 111, and sends a control command value 1514 such as a speed value or a steering angle value that serves as a control command to the engine ECU, the brake ECU, and the steering ECU based on the information thereof.

Figure 3:
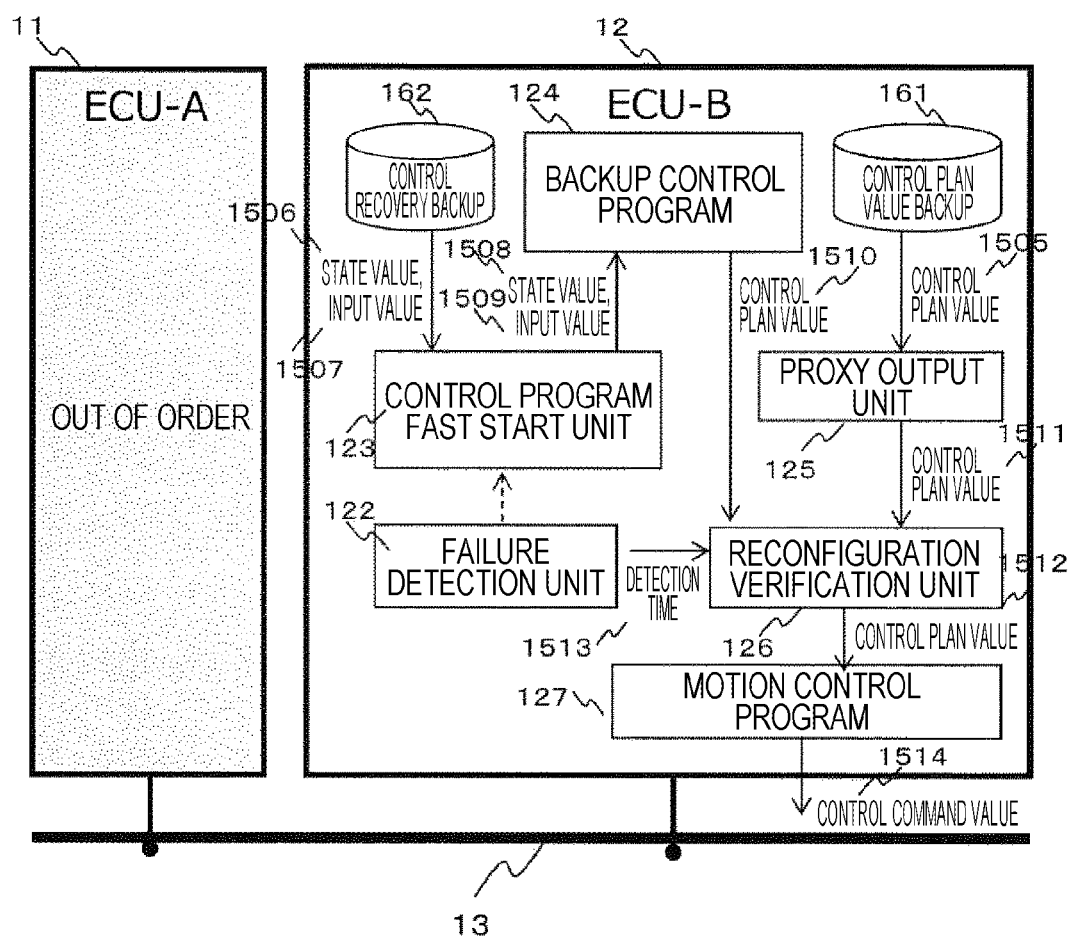
FIG. 3 illustrates an operation flow in a recovery mode according to the first embodiment.

FIG. 3 is an operation flow in a recovery mode 1022 according to the first embodiment.

The ECU-B 12 includes a failure detection unit 122, control program fast start unit 123, a backup control program 124, a proxy output unit 125, a reconfiguration verification unit 126, and the motion control program 127, and the ECU-A 11 is out of order.

When the failure detection unit 122 detects a failure of the ECU-A 11, the failure detection unit 122 changes to a recovery mode and notifies the reconfiguration verification unit 126 of a failure time 1513. The method for detecting a failure may be to determine as a failure when data from the ECU-A 11 do not arrive for a certain period of time, or may be another method. In the present embodiment, a failure means being not in a normal state assumed in the design. Therefore, the failure not only indicates an event in which hardware of the ECU-A 11 is physically broken, but also includes, for example, design failures (bugs) and deadlocks such that the ECU-A 11 is repeatedly reset and does not start. Further, it also includes a network bus failure between ECU-A 11 and ECU-B 12. A method for notification may use an interrupt signal, or the reconfiguration verification unit 126 may monitor an update of the detection time 1513 periodically in advance. The failure detection unit 122 executes the control program fast start unit 123.

The control program fast start unit 123 reads the state value 1506 and the input value 1507 in time series from the control recovery backup 162, and executes the backup control program 124 based on the time series until the backup control program 124 can output a control plan value 1510 as a value intended at the time of design.

The proxy output unit 125 reads the control plan value 1505 from the control plan value backup 161, and outputs a control plan value 1511. The control plan value 1505 and the control plan value 1511 may be the same value, or may be converted based on specific rules.

The reconfiguration verification unit 126 compares the control plan value 1510 with the control plan value 1511 based on the detection time 1513, changes to a degeneration mode 1023 when it is determined that the recovery is complete, and outputs the control plan value 1510 as a control plan value 1512. When it is determined that the recovery is not completed, the control plan value 1511 is output as the control plan value 1512. When the recovery is not completed within a certain time from the detection time 1513, the mode is changed to a fail safe mode 1024. Note that the control plan values used for comparison by the reconfiguration verification unit 126 and the output control plan value do not necessarily have to be the same. For example, control plan values including past control plan values may be compared at the time of comparison, and the control plan values at the time of output may be a value narrowed to only a control plan value from the present to the future.

When the motion control program 127 has not received a new control plan value 1503, the motion control program 127 sends the control command value 1514 based on the control plan value 1512. The algorithm for calculating the control command value 1514 may be changed between the control plan value 1503 and the control plan value 1512, or may be the same.

Figure 4:
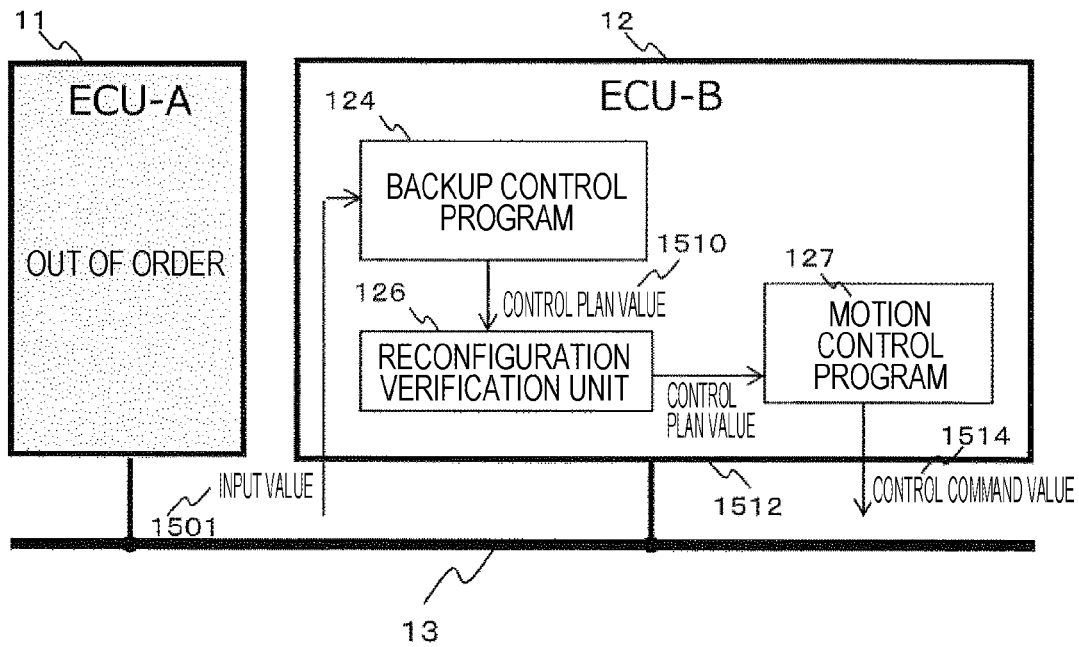
FIG. 4 illustrates an operation flow in a degeneration mode according to the first embodiment.

FIG. 4 is an operation flow in the degeneration mode 1023 according to the first embodiment. The ECU-B 12 includes the backup control program 124, the reconfiguration verification unit 126, and the motion control program 127, and the ECU-A 11 is out of order. The backup control program in the degeneration mode updates the internal state based on the input value 1501, and outputs the control plan value 1510. The reconfiguration verification unit 126 in the degeneration mode outputs the control plan value 1512 based on the control plan value 1510. When the motion control program 127 has not received the new control plan value 1503, the motion control program 127 sends the control command value 1514 based on the control plan value 1512. The algorithm for calculating the control command value 1514 may be changed between the control plan value 1503 and the control plan value 1512, or may be the same.

Figure 5:
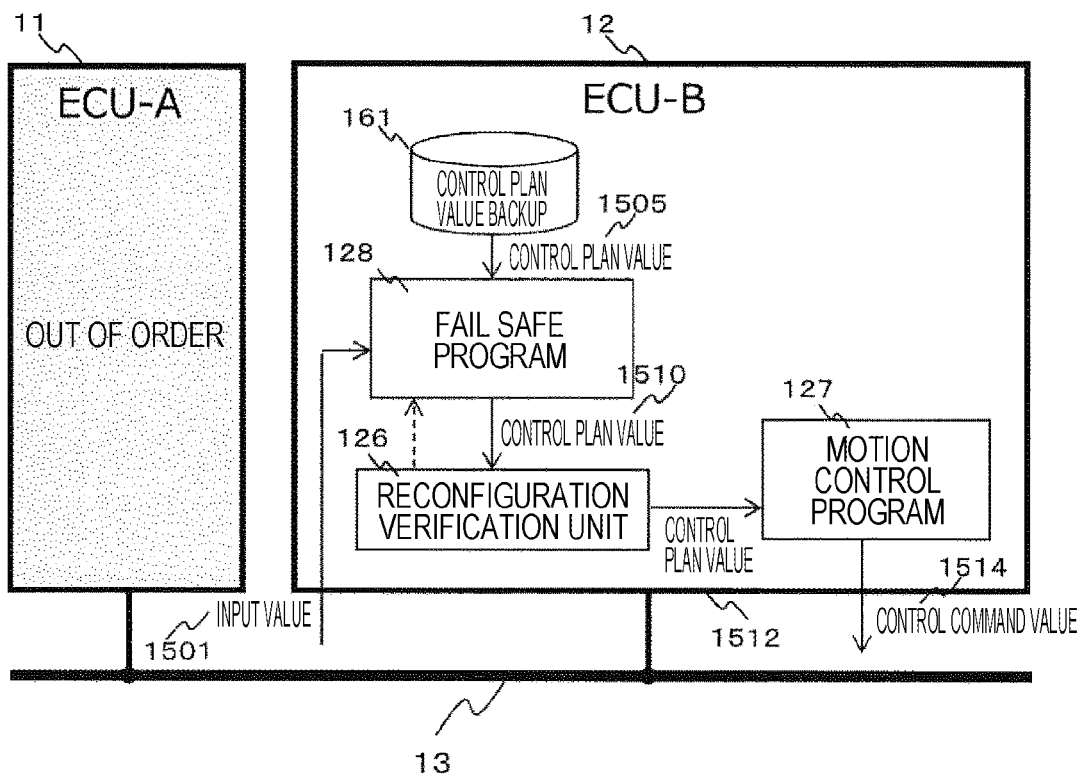
FIG. 5 illustrates an operation flow in a fail safe mode according to the first embodiment.

FIG. 5 is an operation flow in the fail safe mode 1024 according to the first embodiment. The ECU-B 12 includes a fail safe program 128, the reconfiguration verification unit 126, and the motion control program 127, and the ECU-A 11 is out of order. When having changed to the fail safe mode, the reconfiguration verification unit 126 is activated so that the fail safe program 128 is periodically executed. In the present embodiment, it is assumed that the program is executed periodically, but the present invention is not limited thereto. For example, the reconfiguration verification unit 126 may execute the fail safe program 128.

The fail safe program 128 outputs the control plan value 1510 based on the control plan value 1505 stored in the control plan value backup 161 and the input value 1501. In this embodiment, the control plan value 1512 is output from the input value 1501 and the control plan value 1510, but the present invention is not limited thereto. For example, the control plan value 1512 may be output from only the control plan value 1510.

When the motion control program 127 has not received the new control plan value 1503, the motion control program 127 sends the control command value 1514 based on the control plan value 1512. The algorithm for calculating the control command value 1514 may be changed between the control plan value 1503 and the control plan value 1512, or may be the same.

Figure 6:
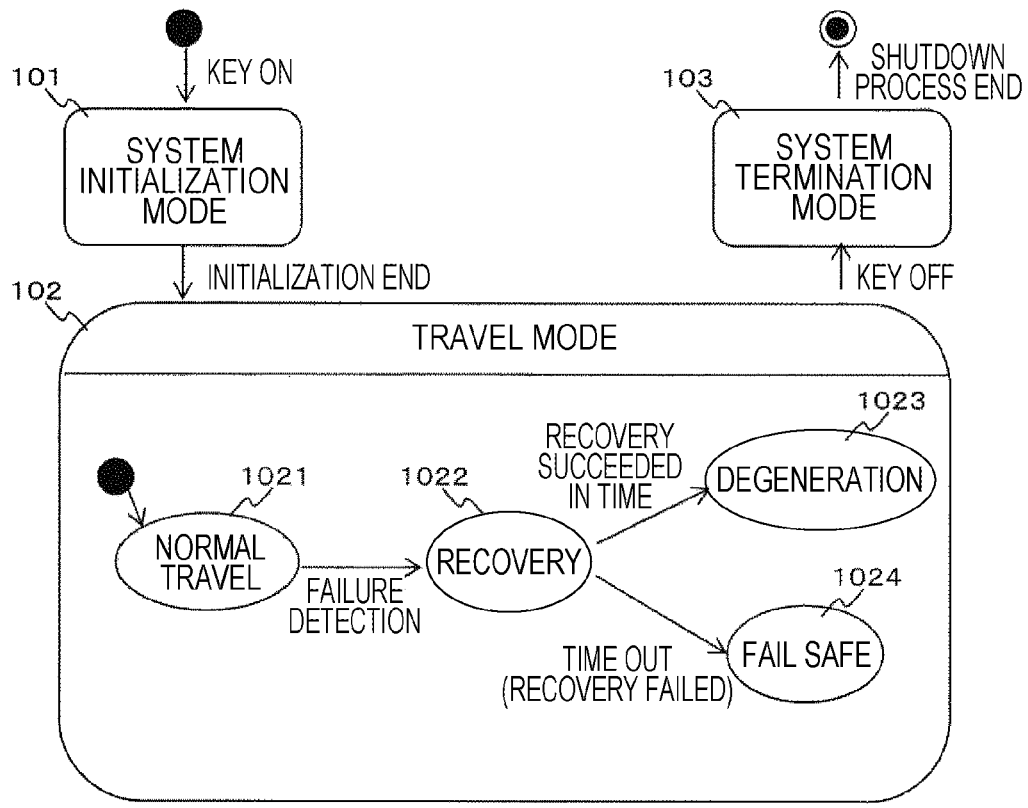
FIG. 6 is a state transition diagram of the system according to the first embodiment.

FIG. 6 is a state transition diagram of the vehicle system 1 according to the first embodiment. When the vehicle system 1 is activated (key ON), the mode is changed to a system initialization mode 101. In the initialization mode, each ECU program is initialized. When the initialization is completed, the mode is changed to the normal travel mode 1021 of the travel mode 102. In the normal travel mode 1021, when a failure is detected, the mode is changed to the recovery mode 1022. In the recovery mode 1022, when the recovery of the backup control program is successful in time, the mode is changed to the degeneration mode 1023. If the recovery is not successful in time and a predetermined time is exceeded, the mode is changed to the fail safe mode 1024. The predetermined time is the control plan value 1505 stored in the trajectory plan value backup 161, and is determined by a time when it is no longer possible to ensure safety of the control system.

However, it is not limited thereto. For example, the user may define the predetermined time independently. When the vehicle system 1 is turned off, the mode is changed to a system termination mode 103. In the system termination mode 103, a shutdown process for storing the learned value and the like is performed, and when completed, the vehicle system 1 is terminated.

Hereinafter, details of an operation flow according to the first embodiment will be described.

Figure 7:
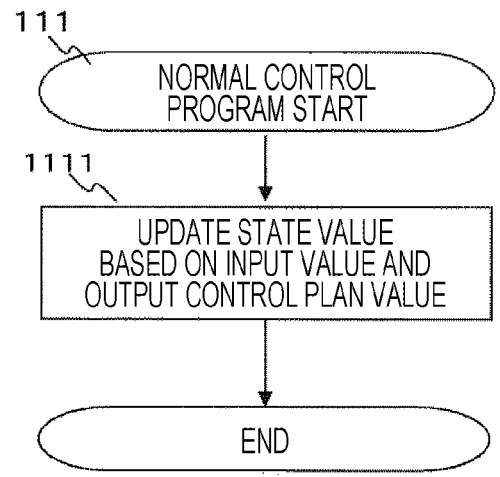
FIG. 7 illustrates an operation flow of a normal control program.

FIG. 7 is an operation flow of the normal control program 111. Hereinafter, each step of FIG. 7 will be described.

(FIG. 7: Step 1111)

The normal control program 111 updates a state value 1502 indicating an internal state based on an input value 1501, and outputs a control plan value 1503.

Figure 8:
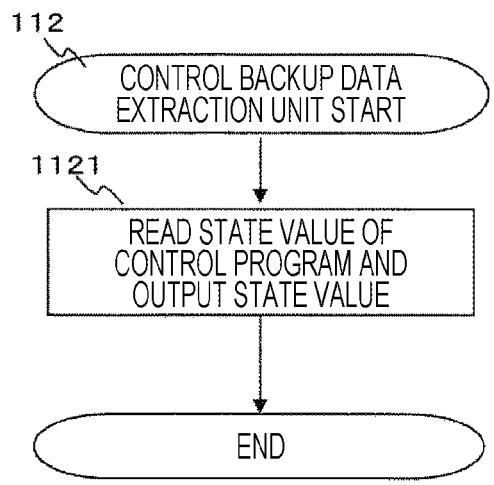
FIG. 8 illustrates an operation flow of a control backup data extraction unit.

FIG. 8 is an operation flow of the control backup data extraction unit 112. Hereinafter, each step of FIG. 8 will be described.

(FIG. 8: Step 1121)

The control backup data extraction unit 112 reads the state value 1502 indicating the internal state of the normal control program 111 and outputs a state value 1504. The state value 1502 and the state value 1504 may be the same value, or may be different values converted according to a specific rule.

Figure 9:
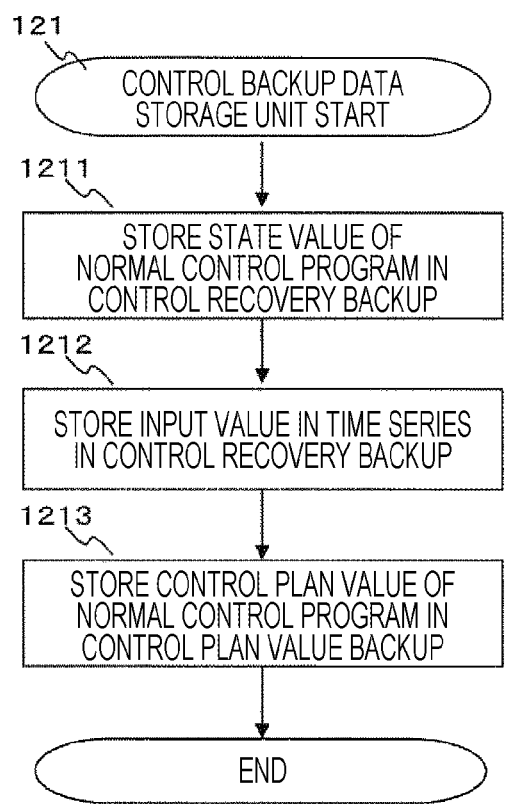
FIG. 9 illustrates an operation flow of a control backup data storage unit.

FIG. 9 is an operation flow of the control backup data storage unit 121. Hereinafter, each step of FIG. 9 will be described.

(FIG. 9: Step 1211)

The control backup data storage unit 121 stores the received state value 1504 of the normal control program 111 in the control recovery backup 162.

(FIG. 9: Step 1212)

The control backup data storage unit 121 stores the received input value 1501 in time series in the control recovery backup 162.

(FIG. 9: Step 1213)

The control backup data storage unit 121 stores the received control plan value 1503 of the normal control program 111 in time series in the control plan value backup 161.

Figure 10:
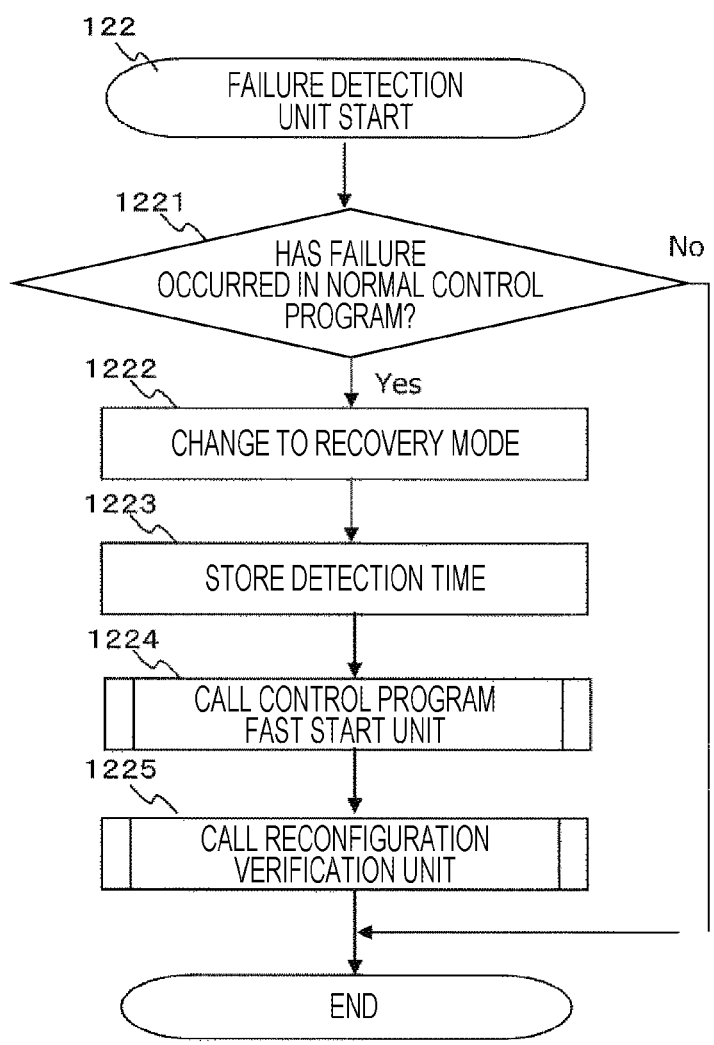
FIG. 10 illustrates an operation flow of a failure detection unit.

FIG. 10 is an operation flow of the failure detection unit 122. Hereinafter, each step of FIG. 10 will be described.

(FIG. 10: Step 1221)

The failure detection unit 122 determines whether a failure has occurred or not in the normal control program 111. If it is determined that there is a failure, the process proceeds to Step 1222, otherwise the process is terminated.

(FIG. 10: Step 1222)

The failure detection unit 122 changes the state to the recovery mode 1022. Although it is assumed that the user is notified, the present invention is not limited thereto.

(FIG. 10: Step 1223)

The failure detection unit 122 stores the current time as a detection time 1513.

(FIG. 10: Step 1224)

The failure detection unit 122 calls the control program fast start unit 123.

(FIG. 10: Step 1225)

The failure detection unit 122 calls the reconfiguration verification unit.

Figure 11:
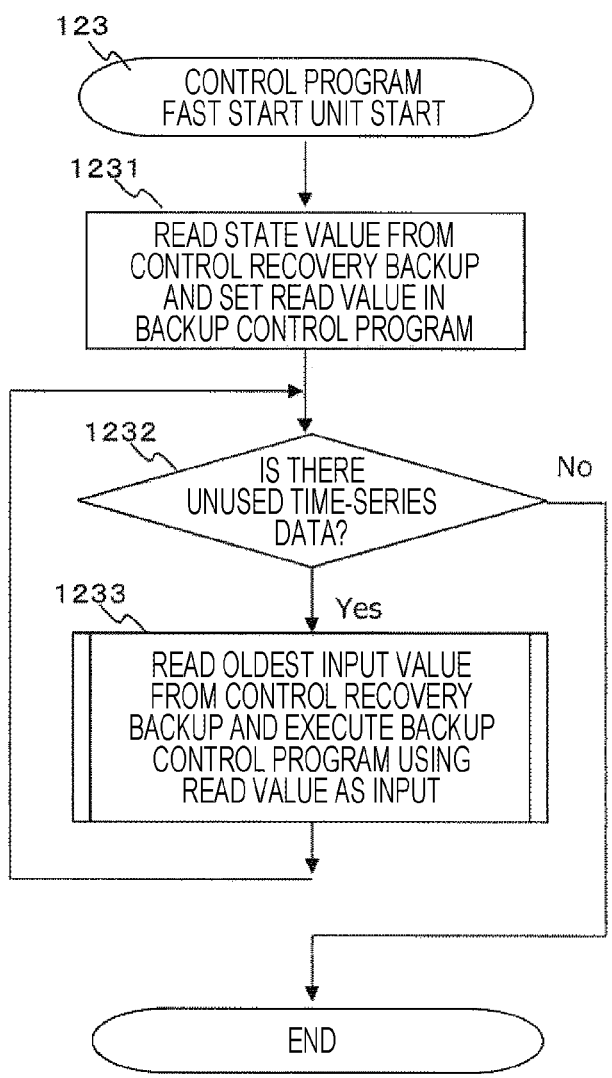
FIG. 11 illustrates an operation flow of a control program fast start unit.

FIG. 11 is an operation flow of the control program fast start unit 123. Hereinafter, each step of FIG. 11 will be described.

(FIG. 11: Step 1231)

The control program fast start unit 123 reads the state value 106 from the control recovery backup 162 and sets the read value in the backup control program 124.

(FIG. 11: Step 1232)

The control program fast start unit 123 determines whether there is unused time-series data or not. The time-series data is the state value 1506 and the input value 1507 or only the input value 1507 stored in time series order. If there is unused time-series data, the process proceeds to Step 1233, or if not, the process ends.

(FIG. 11: Step 1233)

The control program fast start unit 123 reads the oldest input value from the control recovery backup 162, and executes the backup control program using the read value as an input.

Figure 12:
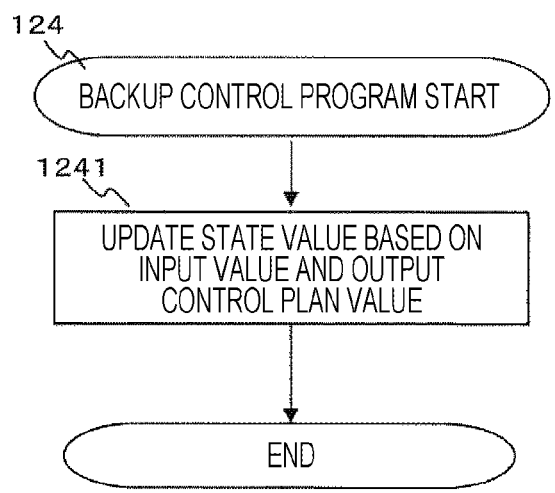
FIG. 12 illustrates an operation flow of a backup control program.

FIG. 12 is an operation flow of the backup control program 124. Hereinafter, each step of FIG. 12 will be described.

(FIG. 12: Step 1241)

The backup control program 124 updates the state value inside the program based on an input value 1509 and outputs the control plan value 1510. The output indicates a state that the value can be referred to by another program. For example, there is saving to memory, or the like.

Figure 13:
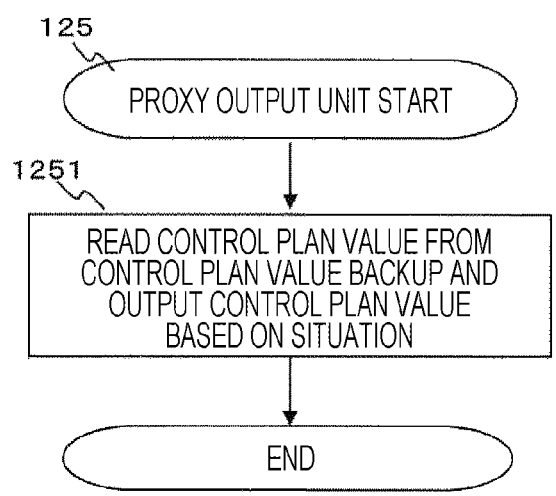
FIG. 13 illustrates an operation flow of a proxy output unit.

FIG. 13 is an operation flow of the proxy output unit 125. Hereinafter, each step of FIG. 13 will be described.

(FIG. 13: Step 1251)

The proxy output unit 125 reads the control plan value 1505 from the control plan value backup 161, and outputs the control plan value based on the situation. The situation indicates, for example, a planned time from failure detection, but is not limited thereto. For example, by obtaining information on the vehicle system or information on the outside world from the input value 1501, the control plan value may be output based on the information.

Figure 14:
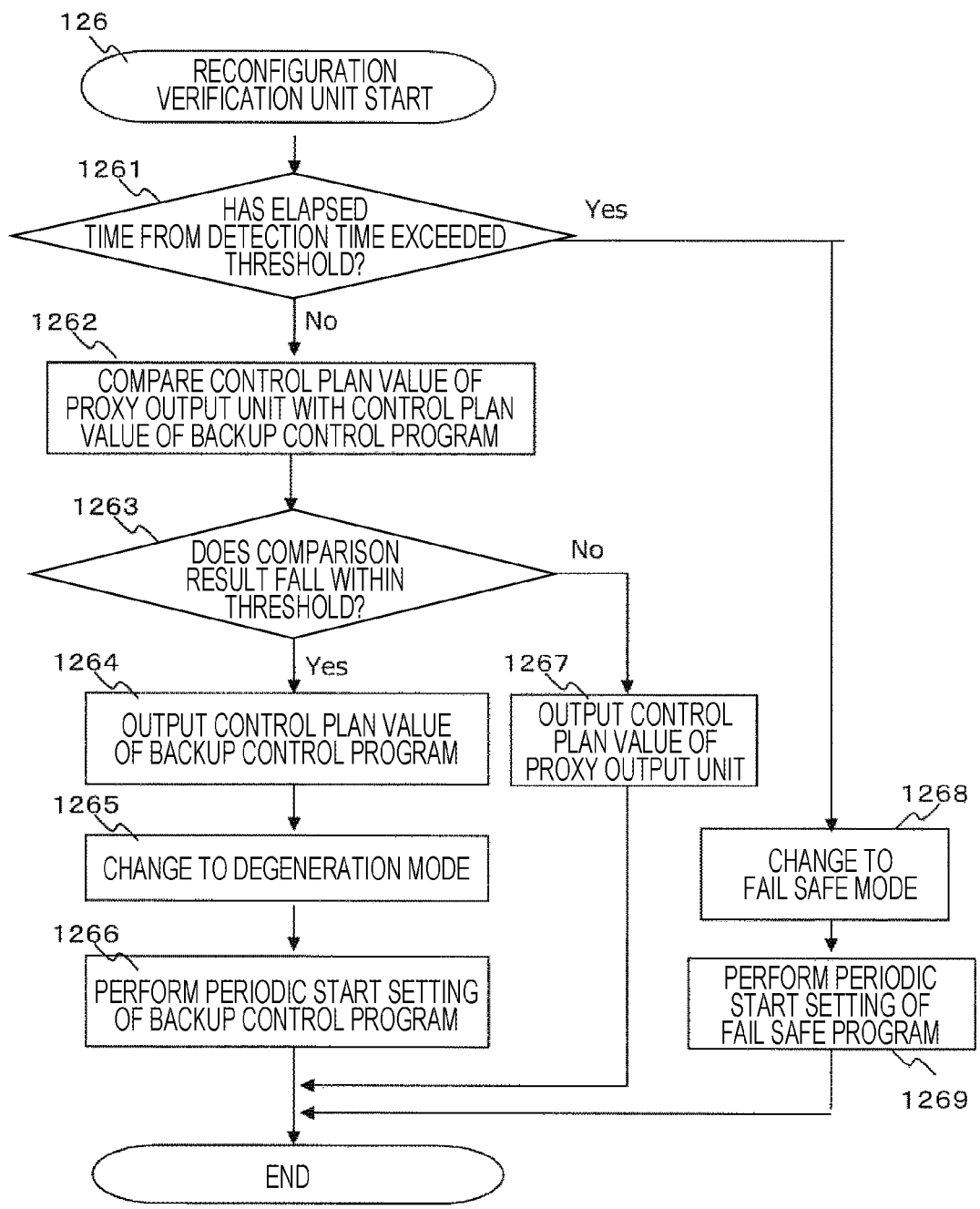
FIG. 14 illustrates an operation flow of a reconfiguration verification unit.

FIG. 14 is an operation flow of the reconfiguration verification unit 126. Hereinafter, each step of FIG. 14 will be described.

(FIG. 14: Step 1261)

The reconfiguration verification unit 126 determines whether an elapsed time from the detection time 1513 has exceeded a threshold or not. If the elapsed time has exceeded, the process proceeds to Step 1268, or if not, the process proceeds to Step 1262.

(FIG. 14: Step 1262)

The reconfiguration verification unit 126 compares the control plan value 1511 of the proxy output unit 125 with the control plan value 1510 of the backup control program 124.

(FIG. 14: Step 1263)

If a comparison result falls within a threshold, the process proceeds to Step 1264, or if not, the process proceeds to 1267.

(FIG. 14: Step 1264)

The reconfiguration verification unit 126 outputs the control plan value 1510 of the backup control program 124 as a control plan value 1512.

(FIG. 14: Step 1265)

The reconfiguration verification unit 126 changes to the degeneration mode 1023. Although it is assumed that the user is notified of the mode change, the present invention is not limited thereto.

(FIG. 14: Step 1266)

The reconfiguration verification unit 126 performs periodic start setting of the backup control program 124.

(FIG. 14: Step 1267)

The reconfiguration verification unit 126 outputs the control plan value 1511 of the proxy output unit 125 as the control plan value 1512.

(FIG. 14: Step 1268)

The reconfiguration verification unit 126 changes to the fail safe mode 1024. Although it is assumed that the user is notified of the mode change, the present invention is not limited thereto.

(FIG. 14: Step 1269)

The reconfiguration verification unit 126 activates the fail safe program 128 and performs setting to start periodically.

Figure 15:
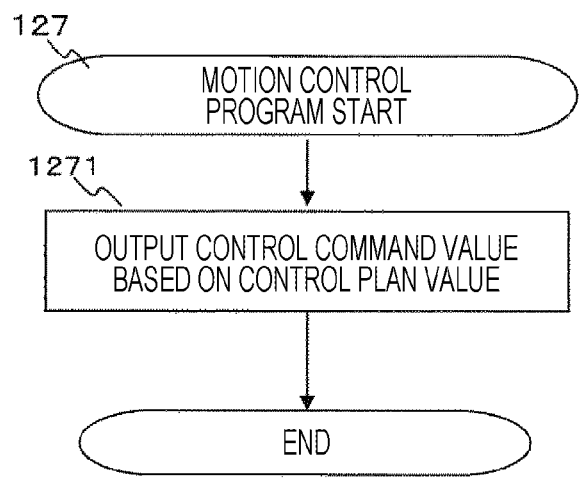
FIG. 15 illustrates an operation flow of a motion control program.

FIG. 15 is an operation flow of the motion control program 127. Hereinafter, each step of FIG. 15 will be described.

(FIG. 15: Step 1271)

The motion control program 127 outputs a control command value 1514 based on the control plan value 1512. Although it is assumed that the control command value 1514 is transmitted to the network, the present invention is not limited thereto. For example, it is conceivable to store the control command value in a memory so as to allow reference by other programs.

Figure 16:
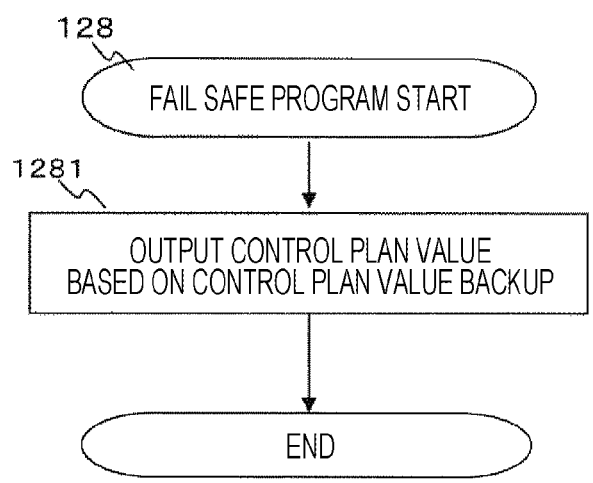
FIG. 16 illustrates an operation flow of a fail safe program.

FIG. 16 is an operation flow of the fail safe program 128. Hereinafter, each step of FIG. 16 will be described.

(FIG. 16: Step 1281)

The fail safe program 128 outputs the control plan value 1510 based on the control plan value 1505 of the control plan value backup 161. If the control plan value contains information such as a speed command, in principle, the speed command is not output as it is. For example, the control plan value 1510 changed so as to gradual decelerate as time passes is output.

Figure 17:
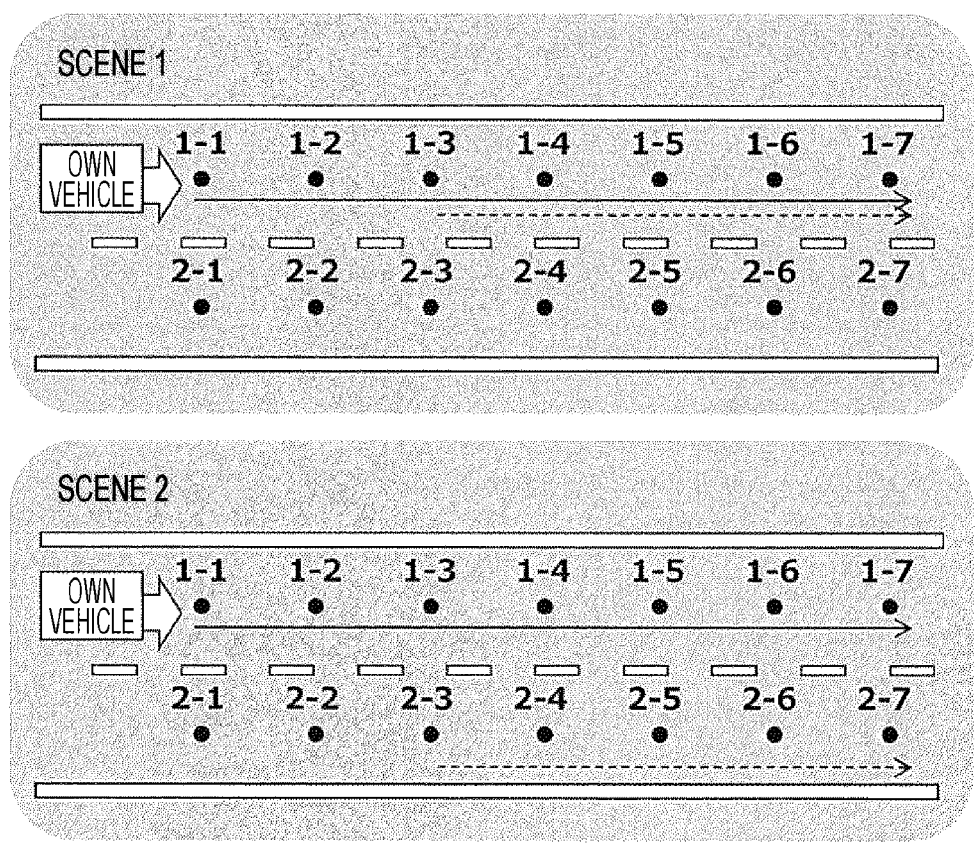
FIG. 17 illustrates a comparison of control plan values with a travel start as an example.

FIG. 17 is a comparison between the control plan value 1510 and the control plan value 1511 taking a travel path as an example. A solid line arrow indicates the control plan value 1511 of the control plan value backup 161, and a dotted line arrow indicates the control plan value 1510 of the backup control program 124. An "own vehicle" indicating the current location of the vehicle system is stored in the control plan value 1511 so as to pass through driving points 1-1 to 1-7 on a road. If a time until arrival at 1-7 is a timeout period, the control plan value 1510 is calculated so as to pass through 1-3 to 1-7 in scene 1. Thus, the control plan value matches at the point 1-3, and the mode is changed to the degeneration mode 1023. However, in the case of scene 2, since the control plan value 1510 is calculated so as to pass through 2-3 to 2-7, the recovery does not succeed, and the mode is changed to the fail safe mode 1024 at a time of timeout.

Figure 18:
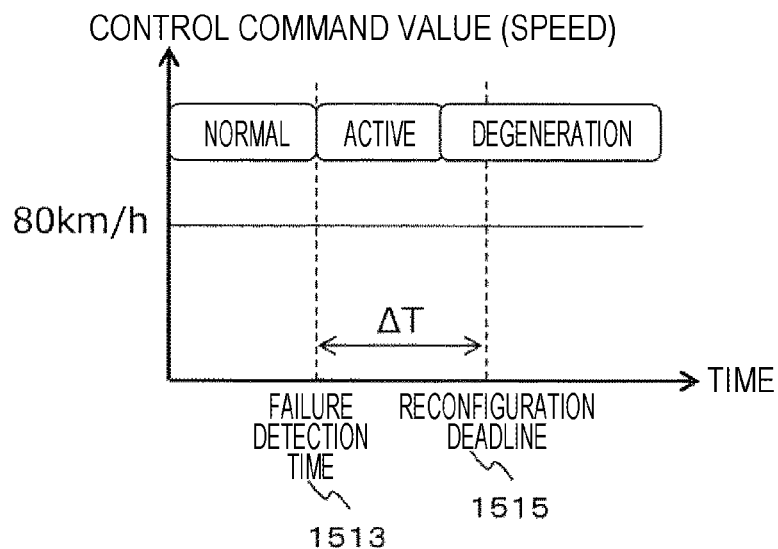
FIG. 18 illustrates an example of control command values in the degeneration mode and the fail safe mode.
Figure 18:
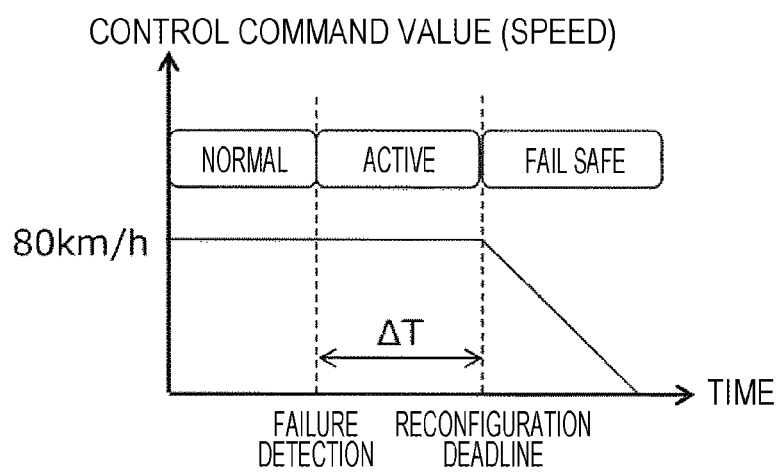

FIG. 18 illustrates an example of the control command value 1514 in the degeneration mode 1023 and the fail safe mode 1024. Scene 1 is an example of a case in which after failure detection, the mode can be changed to the degeneration mode 1023 within a reconfiguration deadline 1515$\Delta$T. In the first embodiment, the reconfiguration deadline 1515 is defined by the elapsed time from the failure detection time 1513, but is not limited thereto. For example, it may be defined as an elapsed time from a failure occurrence time.

In the degeneration mode 1023 of this example, since the control can be taken over by the backup control program 124 after the failure, the backup control program 124 outputs 80 km similar to the control command value 80 km of the normal control program 111.

On the other hand, the scene 2 is an example of a case where it is not possible to be changed to the degeneration mode 1023 within a reconfiguration deadline $\Delta$T. When the reconfiguration deadline $\Delta$T is exceeded, it is changed to the fail safe mode 1024. In the fail safe mode 1023, the fail safe program 128 performs control so as to reduce the speed, and outputs the control command value 1514 so that the vehicle gradually stops.

In the first embodiment, the case where the ECU-A fails is described, but the present invention is not limited thereto. For example, a case is conceivable where the network bus between the ECU-A and the ECU-B fails, the ECU-B cannot receive the control plan value from the ECU-A, and the failure detection unit determines that the ECU-A is failed.

In the first embodiment, recovery is performed in ECU-B immediately after the failure of the ECU-A, but the present invention is not limited thereto. For example, a reset may be performed in the ECU-A so as to recover from the failure. If it does not recover by the reset, it may be determined that the software is not temporarily failed but permanently failed, and the backup control program may be started by the ECU-B.

In the first embodiment, the fail safe program is configured to start after exceeding the reconfiguration deadline, but is not limited thereto. For example, the fail safe program may always be executed. In that case, it is conceivable to compare a control instruction value of the fail safe program or a control value instruction value of another normal control program.

In the first embodiment, it is assumed that the fail safe program outputs a control command value, but the present invention is not limited thereto. For example, it may be a screen output for notifying the user.

According to the first embodiment, if the control plan value 1503 of the ECU-A 11 does not arrive at the ECU-B 12 as designed, the ECU-B 12 can perform a fail operational action to determine a function failure and switch to the control backup program. If it continues to operate normally, it is not necessary to execute the control backup program, and thus CPU resources and RAM resources can be saved.

According to the first embodiment, even in the ECU-B 12 that receives the input value 1509 periodically in the backup control program 124 that needs to be executed multiple times using the received input value 1509 so as to output an initial normal control plan value, the control program fast start unit 123 can output the initial normal control plan value of the backup control program 124 in a time less than the necessary number of executions×the reception cycle. The necessary number of executions is assumed to be equal to or larger than the number of differentiations in an equation of motion of the backup control program 124, but is not limited thereto.

According to the first embodiment, the failure detection unit 122 measures the detection time 1513, and thus the reconfiguration verification 126 can determine a recovery timeout (reconfiguration deadline $\Delta$T).

According to the first embodiment, while the backup control program 124 is being initialized, the proxy output unit 125 outputs the control plan value generated before the failure on behalf of the normal control program. Since the control plan value is generated before the failure, it is a reasonable value and the control system will not crash.

According to the first embodiment, the reconfiguration verification unit 126 determines whether recovery of the backup control program is successful or not within the reconfiguration deadline $\Delta$T based on the comparison result with the control plan value of the normal control program, but the present invention is not limited thereto. For example, the reconfiguration verification unit 126 may perform the determination by comparing validity of the control plan value of the backup control program with external information obtained from another sensor.

In the first embodiment, outputs of the normal control program, the backup control program, and the fail safe program are the control plan values, but are not limited thereto. For example, the outputs may be control command values.

In the first embodiment, the normal control program is switched to the backup control program when a failure occurs, but the present invention is not limited thereto. For example, in a vehicle system provided with two types of normal control programs, when one of the normal control programs fails, it may be switched to the other. Similarly, when the normal control program fails, it may be switched to a control program with a higher function level.

In the first embodiment, communication between the ECU-A and the ECU-B is performed via the bus-type network 13, but is not limited thereto. For example, a known wireless communication such as WiFi may be used, or a shared memory may be used.

In the first embodiment, an ECU is taken as an example of a controller, but the present invention is not limited thereto. A controller used in factory automation may be used, or a mobile terminal may be used.

In the first embodiment, when the ECU-A 11 fails, the control backup program is activated by the ECU-B 12, which is another ECU, but the present invention is not limited thereto. For example, if the cause of failure is a malfunction of the normal control program, all of software such as the backup control program and data of the ECU-B 12 may be placed in the ECU-A 11, so as to allow the ECU-A 11 to perform recovery using the backup control program.

In the first embodiment, it is assumed that the normal control program 111, the backup control program 124, and the fail safe program 128 are executed by a CPU (Central Processing Unit), but the present invention is not limited thereto. For example, a field-programmable gate array (FPGA) may be used, or a general-purpose computing on graphics processing units (GPGPU) may be used.

In the first embodiment, the fail safe program is activated after a failure is detected, but the present invention is not limited thereto. For example, the fail safe program may always be activated in the same manner as the normal control program.

In the first embodiment, the reconfiguration verification unit is executed after the input values stored in the control recovery backup are input in time series order to the backup control program for execution, but the present invention is not limited thereto. For example, the reconfiguration verification unit may be executed sequentially each time the backup control program is updated with time-series data.

In the first embodiment, a plurality of ECUs are taken as an example, but the present invention is not limited thereto. For example, in a multi-core system, the ECU-A may be one core and the ECU-B may be the other core.

In the first embodiment, the reconfiguration verification unit 126 immediately changes to the fail safe mode when the planned time from the failure detection time exceeds the threshold, but the present invention is not limited thereto. For example, when the current state of the vehicle is not suitable for recovery, the reconfiguration verification unit may change to the fail safe mode after waiting for the state to end.

Second Embodiment

Figure 19:
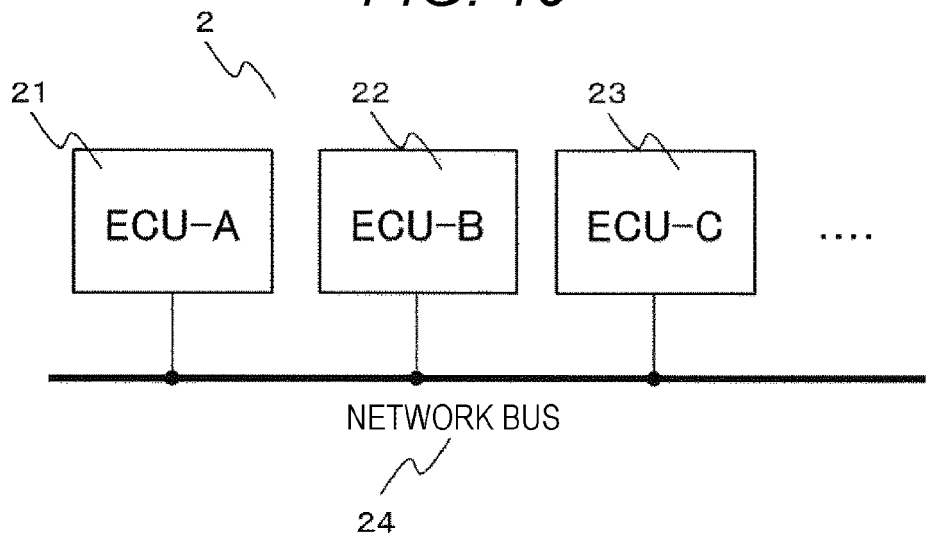
FIG. 19 is a configuration diagram of a vehicle system according to a second embodiment.

FIG. 19 is a configuration diagram of the vehicle system 2 according to a second embodiment of the present invention. This system includes an ECU-A 21, an ECU-B 22, an ECU-C 23, and a network bus 24. The system has a configuration in which the module of the ECUB 12 according to the first embodiment is divided into the ECU-B 22 and the ECU-C 23.

Figure 20:
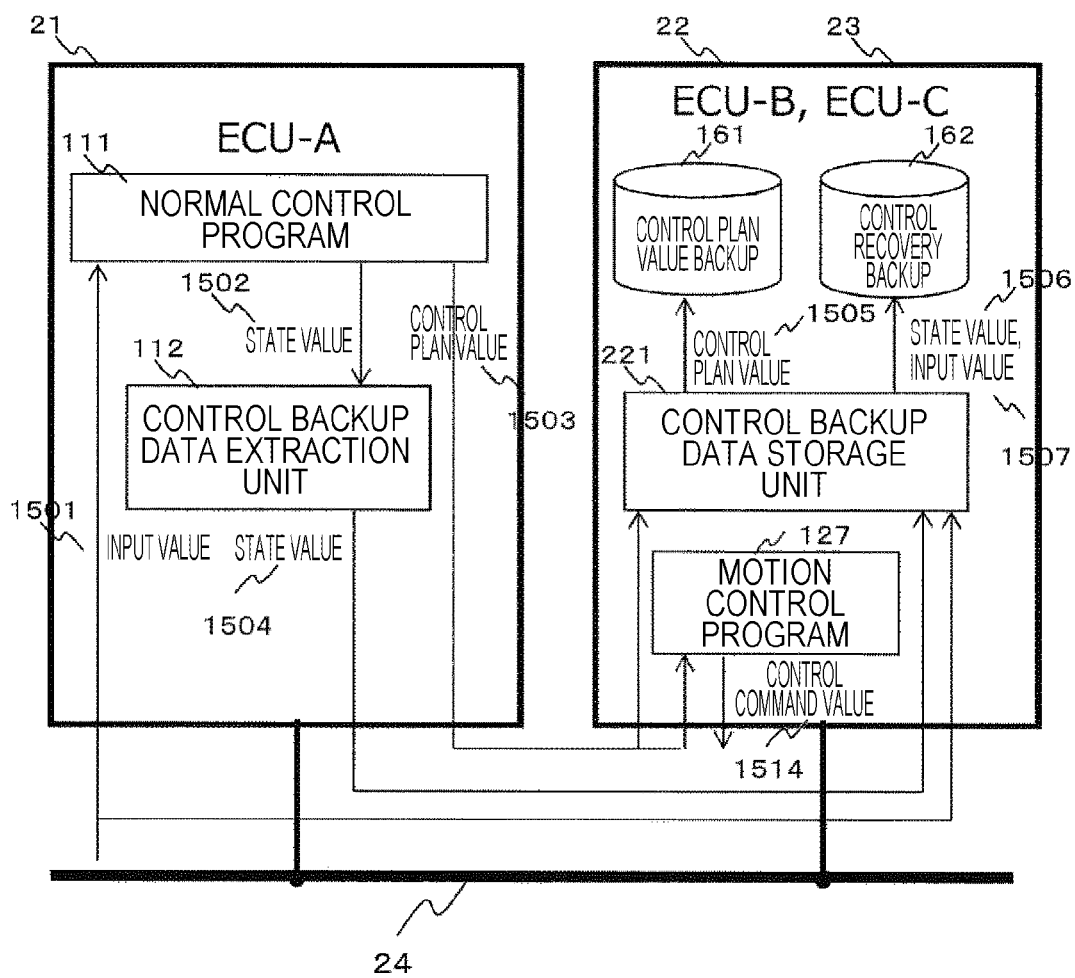
FIG. 20 illustrates an operation flow in a normal travel mode according to the second embodiment.

FIG. 20 is an operation flow in a normal travel mode 1021 according to the second embodiment. The ECU-A 21 is similar to the ECU-A 11 described in FIG. 2, while the ECU-B 22 and the ECU-C 23 have a control backup data storage unit 221 replaced with the control backup data storage unit 121 in the ECU-B 12 described in FIG. 2. The others are similar.

Figure 21:
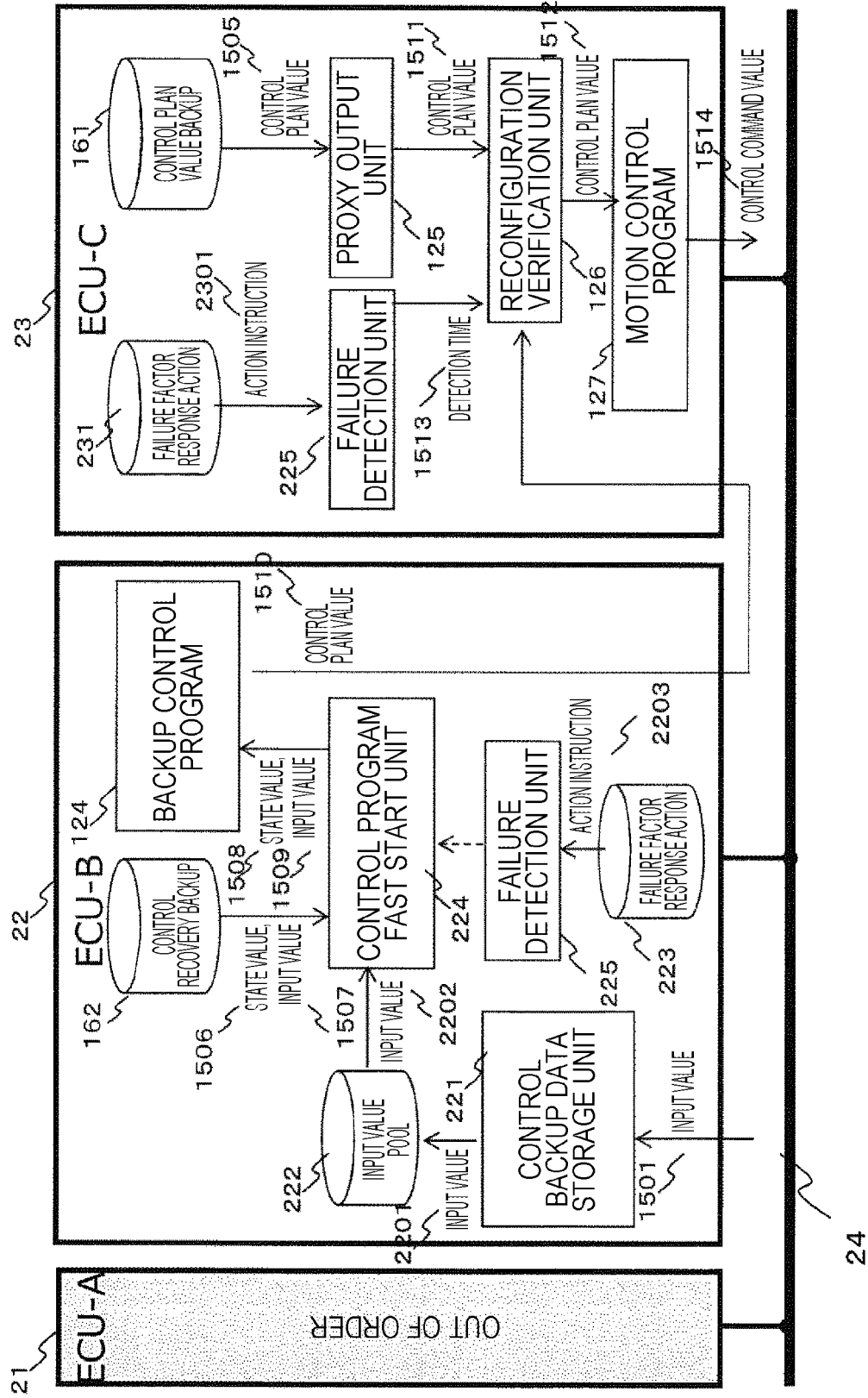
FIG. 21 illustrates an operation flow in a recovery mode according to the second embodiment.

FIG. 21 is an operation flow in a recovery mode 1022 according to the second embodiment. The ECU-B 22 includes the control backup data storage unit 221, a failure detection unit 225, a control program fast start unit 224, and a backup control program 124, the ECU-C 23 includes a failure detection unit 225, a proxy output unit 125, a reconfiguration verification unit 126, and a motion control program 127, and the ECU-A 21 is out of order.

By executing the backup control program 124 and the proxy output unit 125 in different ECUs in this way, it is possible to perform a reset when switching to the backup control program, and it becomes easy to change the configuration of the operating system.

Figure 22:
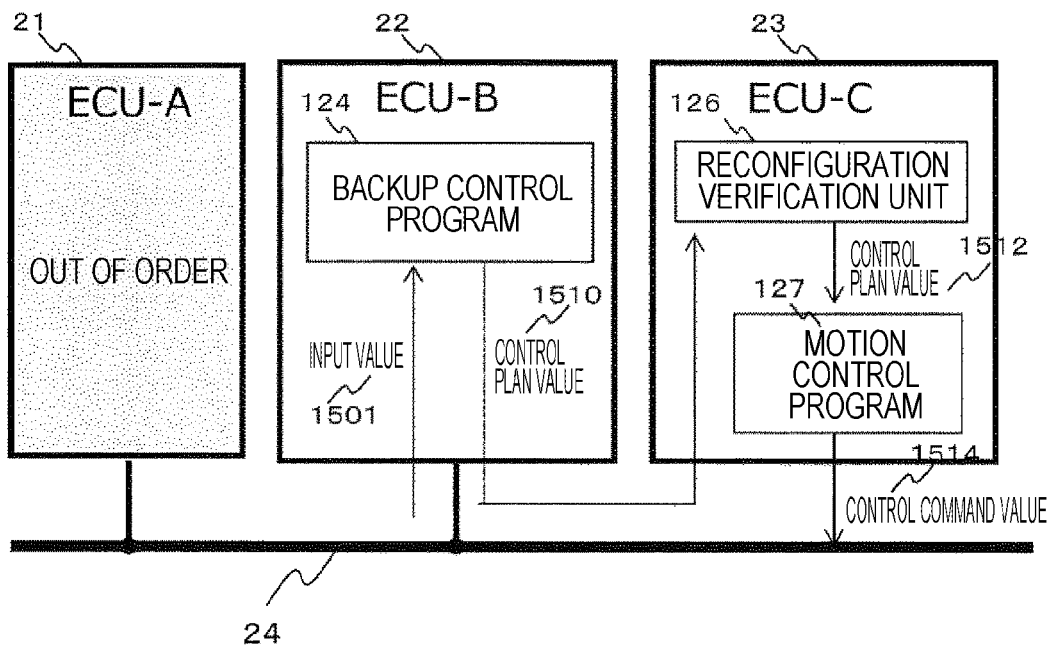
FIG. 22 illustrates an operation flow in a degeneration mode according to the second embodiment.

FIG. 22 is an operation flow in a degeneration mode 1023 according to the second embodiment. The ECU-B 22 includes the backup control program 124, the ECU-C 23 includes the reconfiguration verification unit 126 and the motion control program 127, and the ECU-A 21 is out of order.

Figure 23:
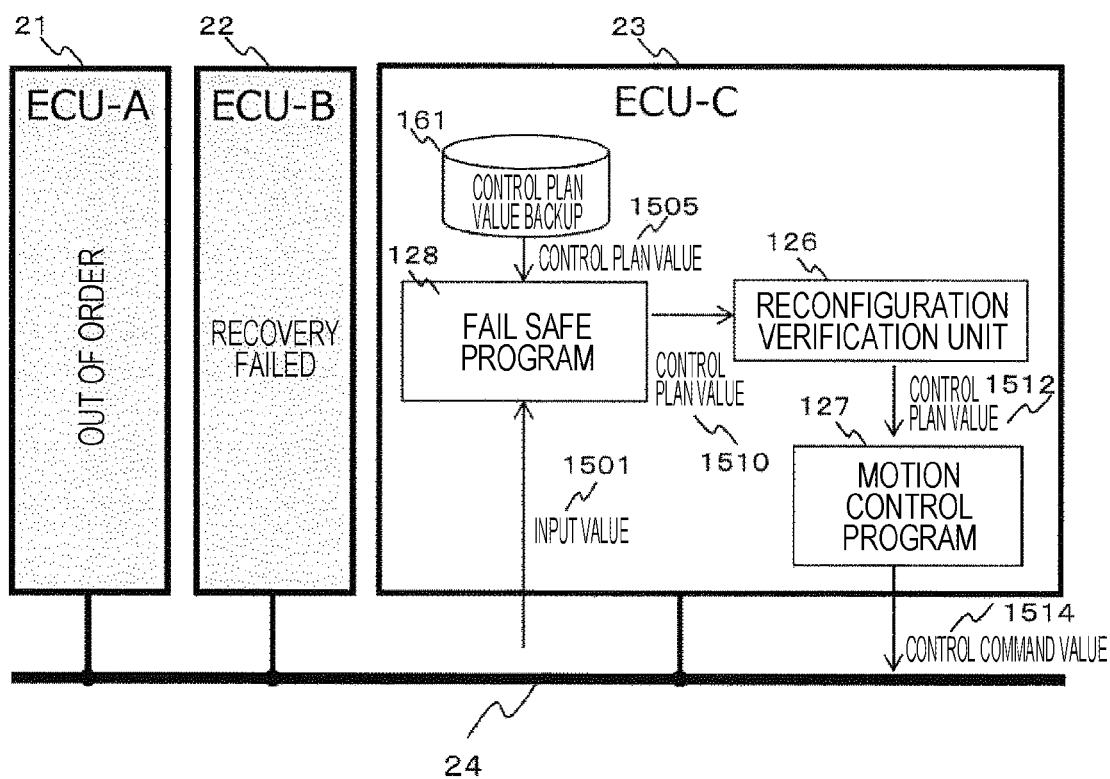
FIG. 23 illustrates an operation flow in a fail safe mode according to the second embodiment.

FIG. 23 is an operation flow in a fail safe mode 1024 according to the second embodiment. The ECU-C 23 includes a fail safe program 128, the reconfiguration verification unit 126, and the motion control program 127. The ECU-A 21 is out of order and the ECU-B 22 is in a recovery timeout state.

Figure 24:
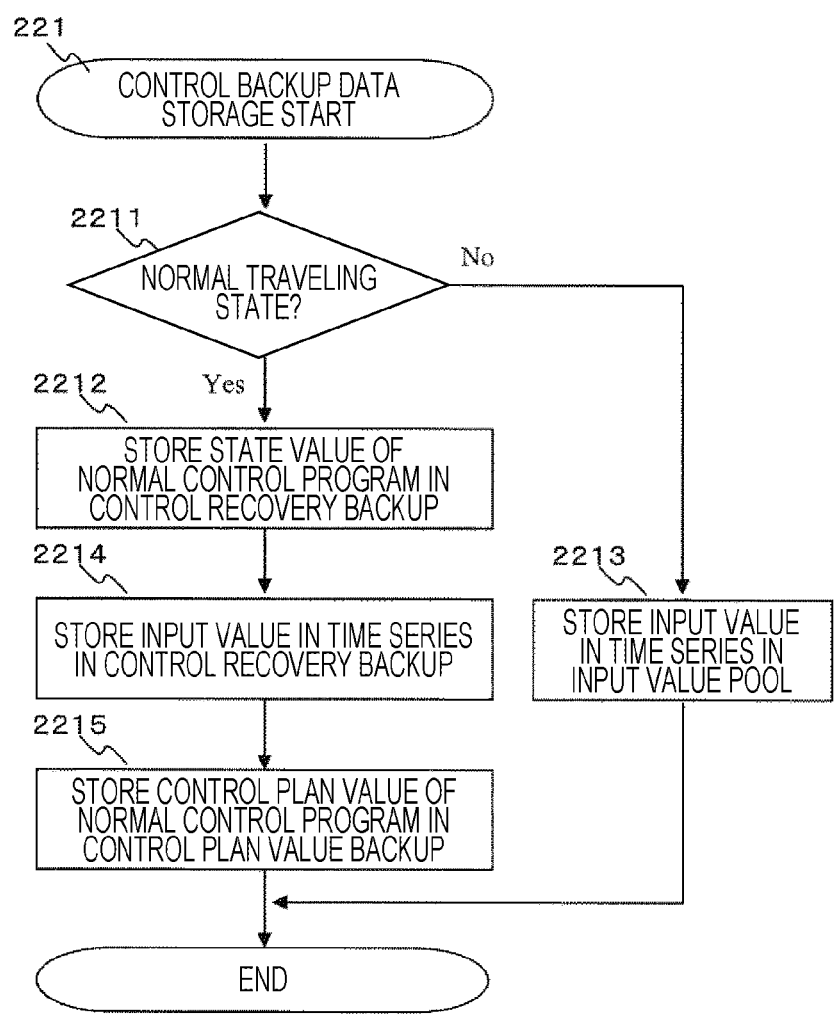
FIG. 24 illustrates an operation flow of a control backup data storage unit.

FIG. 24 is an operation flow of the control backup data storage unit 221. Hereinafter, each step of FIG. 24 will be described.

(FIG. 24: Step 2211)
The control backup data storage unit 221 confirms whether the current system state is a normal traveling state. If it is in the normal traveling state, the process proceeds to Step 2212, or otherwise the process proceeds to Step 2213.

(FIG. 24: Step 2212)
The control backup data storage unit 221 stores a received state value 1504 of the normal control program 111 in a control recovery backup 162.

(FIG. 24: Step 2213)
The control backup data storage unit 221 stores a received input value 1501 in an input value pool 222 in time series.

(FIG. 24: Step 2214)
The control backup data storage unit 221 stores the received input value 1501 in the control recovery backup 162 in time series.

(FIG. 24: Step 2215)
The control backup data storage unit 221 stores a received control plan value 1503 of the normal control program 111 in a control plan value backup 161 in time series.

Figure 25:
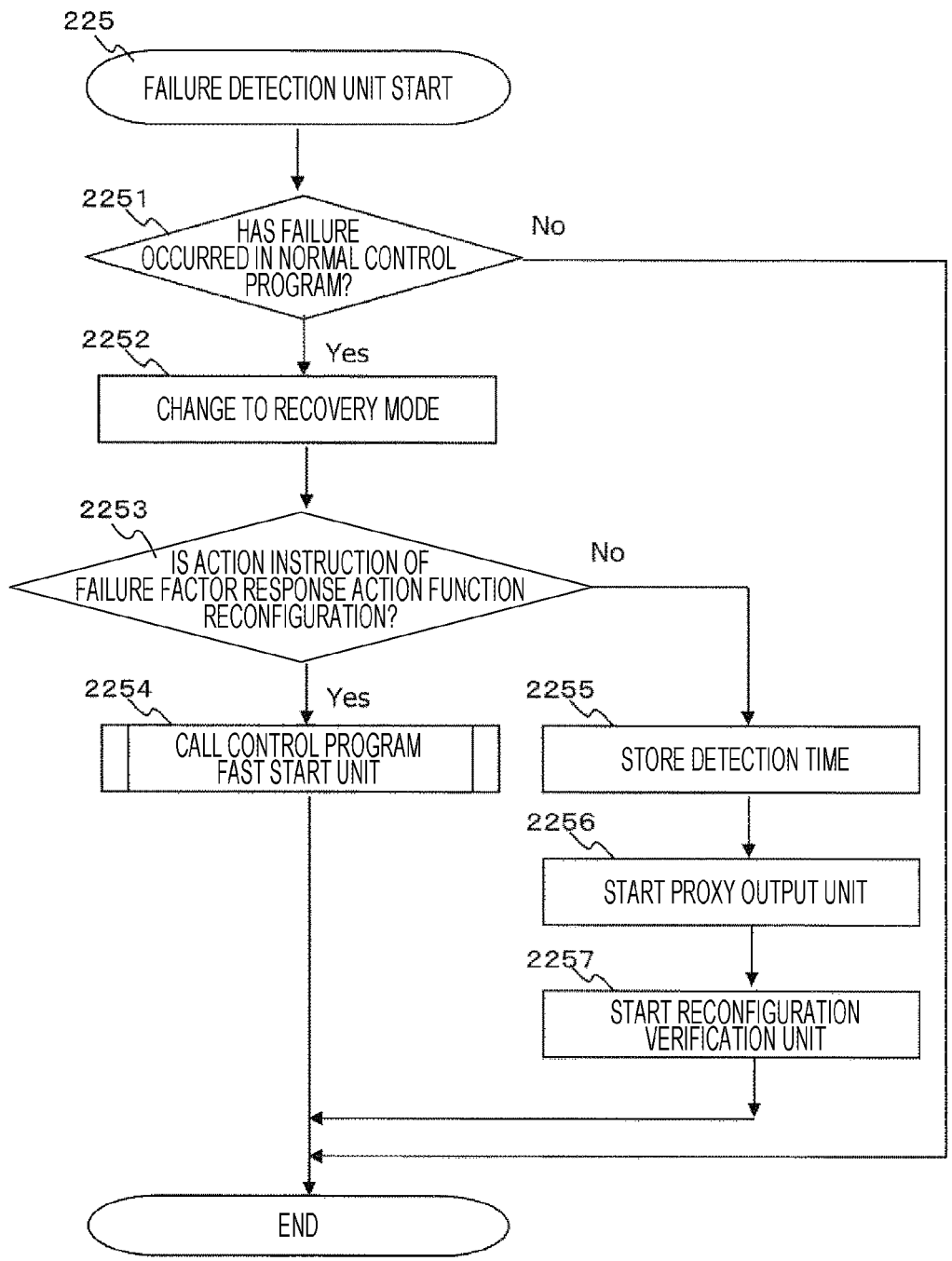
FIG. 25 illustrates an operation flow of a failure detection unit.

FIG. 25 is an operation flow of the failure detection unit 225. Hereinafter, each step of FIG. 25 will be described.

(FIG. 25: Step 2251)
The failure detection unit 225 determines whether a failure has occurred or not in the normal control program 111. If it is determined that there is a failure, the process proceeds to Step 2252, or otherwise the process ends.

(FIG. 25: Step 2252)
The failure detection unit 225 changes the state to the recovery mode 1022. Although it is assumed that the user is notified, the present invention is not limited thereto.

(FIG. 25: Step 2253)
The failure detection unit 225 determines whether action instructions (2203 for ECU-B 22, 2301 for ECU-C 23) of a failure factor response action (223 for ECU-B 22, 231 for ECU-C 23) are a functional reconfiguration or not. If it is a functional reconfiguration, the process proceeds to Step 2254, or otherwise the process proceeds to Step 2255.

(FIG. 25: Step 2254)
The failure detection unit 225 calls a control program fast start unit 123.

(FIG. 25: Step 2255)
The failure detection unit 225 stores the current time as a detection time 1513. It is assumed that the current time is a hardware timer, but is not limited thereto.

(FIG. 25: Step 2256)
The failure detection unit 225 activates the proxy output unit to be executed periodically.

(FIG. 25: Step 2257)
The failure detection unit 225 starts the reconfiguration verification unit 126 to be executed periodically.

Figure 26:
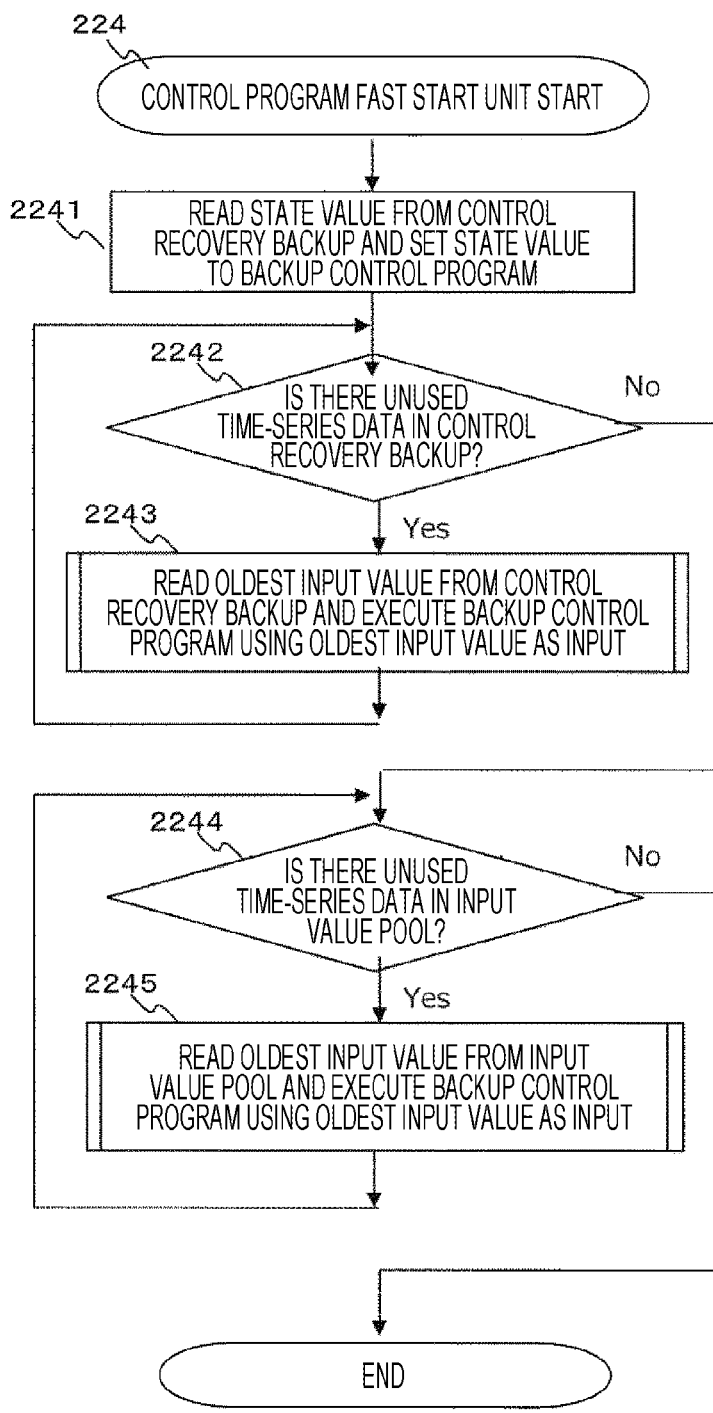
FIG. 26 illustrates an operation flow of a control program fast start unit.

FIG. 26 is an operation flow of the control program fast start unit 224. Hereinafter, each step of FIG. 26 will be described.

(FIG. 26: Step 2241)

The control program fast start unit 224 reads a state value 106 from the control recovery backup 162 and sets the state value in the backup control program 124.

(FIG. 26: Step 2242)

The control program fast start unit 224 determines whether there is unused time-series data or not in the control recovery backup 162. The time-series data is the state value 1506 and the input value 1507 or only the input value 1507 stored in time series order. If there is unused time-series data, the process proceeds to Step 2243, or if not, the process proceeds to Step 2244.

(FIG. 26: Step 2243)

The control program fast start unit 224 reads the oldest input value from the control recovery backup 162, and executes the backup control program using the read value as an input.

(FIG. 26: Step 2244)

The control program fast start unit 224 determines whether there is unused time-series data or not in the input value pool 222. If there is unused time-series data, the process proceeds to Step 2245, or if not, the process ends.

(FIG. 26: Step 2245)

The control program fast start unit 224 reads the oldest input value from the input value pool 222 and executes the backup control program using the read value as an input.

In the second embodiment, it is assumed that the proxy output unit and the reconfiguration verification unit are executed periodically, but the present invention is not limited thereto. For example, the proxy output unit and the reconfiguration verification unit may be executed only once, or the proxy output unit may be stopped in the degeneration mode or the fail safe mode.

According to the second embodiment, it is possible to respond to a newly received input value in the recovery mode owing to the input value pool, and thus stability of control is improved.

According to the second embodiment, even if reset is performed for recovery in the ECU-B 22, the execution of the proxy output unit of the ECU-C 23 is not hindered, and thus stability of control is improved.

The backup control program may be output for the first time after using all the time-series data of the control recovery backup and the input value pool. As a result, the communication load on the network can be reduced. Further, since the backup control program is in the most stable state, safety is improved. On the other hand, when pursuing real-time properties, it may be designed such that intermediate values or the like are output without waiting until all the time-series data are used, and that when the reconfiguration is successful, the mode is immediately switched to the degeneration mode.

Note that the present invention is not limited to the above-described embodiments, but includes various modifications. For example, the above-described embodiments are described in detail to explain the present invention in an easy-to-understand manner, and is not necessarily limited to one having all the described configurations. Further, part of the configuration of one embodiment can be replaced with a configuration of another embodiment, and a configuration of another embodiment can be added to the configuration of one embodiment. Moreover, it is possible to add, delete, and replace other configurations for part of the configurations of the respective embodiments.

In both the first and second embodiments, the backup control program and the control recovery backup are arranged in the same ECU. However, the present invention is not limited thereto. For example, an embodiment may be employed in which the control recovery backup is placed in an ECU different from the backup control program, a state value and an input value of the control recovery backup are received via the network when being in the recovery mode, and the backup control program is executed by the control program fast start unit.

REFERENCE SIGNS LIST

11 ECU-A (controller unit)
12 ECU-B (controller unit)
112 control backup data extraction unit
121 control backup data storage unit
123 control program fast start unit
125 proxy output unit

The invention claimed is:

1. A controller comprising:
a control backup data extraction unit that extracts a state value and a control plan value calculated by a first control program, the control plan value indicating a travel path of a vehicle for a predetermined duration;
a control backup data storage unit that stores, in a time series backup, the state value, the control plan value, and an input value, wherein the time series backup is accessible by a second control program as a backup;
a control program fast start unit that initializes the second control program by inputting the state value and the input value to the second control program in an order of the time series backup responsive to detecting a failure of the first control program;
a proxy output unit that, responsive to detecting the failure, retrieves the control plan value from the time series backup and outputs the control plan value in the order of the time series backup until the second control program has been initialized, such that the vehicle is navigated along the travel path according to the control plan value in the time series backup until the second control program has been initialized, wherein control values generated by the second control program are used to navigate the vehicle after the second control program has been initialized; and
a reconfiguration verification unit that executes a fail safe program in parallel with the second control program, the fail safe program receiving the control plan value in the time series backup and an input value calculated by the first control program and generating a signal for gradually decelerating the vehicle based on the control plan value and the input value, wherein the reconfiguration verification uses the signal generated by the fail safe program in response to failure of the second control program.

2. The controller of claim 1, wherein the reconfiguration verification unit compares, responsive to initializing the second control program, a second control plan value calculated by the second control program with the control plan value output by the proxy output unit; and selects, based on the comparison, a control command value to be output according to a threshold, such that the first control program is not switched to the second control program when it is not possible to navigate the vehicle according to the travel path of the control plan value.

3. The controller of claim 2, wherein the reconfiguration verification unit switches to the fail safe program when switching of the first control program to the second control program is not performed for a predetermined time.

4. The controller of claim 2, wherein the controller notifies a user of a switching result when the failure occurs.

5. The controller of claim 1, wherein the control program fast start unit and the proxy output unit are executed by different hardware.

6. The controller of claim 1, further comprising a plurality of controller units, wherein when a first failure occurs in a first controller unit of the plurality of controller units, a backup control program is started in a second controller unit of the plurality of controller units if a recovery time is within a predetermined time period, and the signal generated by the fail safe program is utilized in the second controller unit of the plurality of controller units if the recovery time exceeds a certain time.

7. The controller of claim 6, wherein the first failure is caused by software, and the backup control program is started in the first controller unit in which the failure has occurred.

\* \* \* \* \*